United States Patent
Rubinger et al.

(10) Patent No.: US 10,991,010 B1
(45) Date of Patent: Apr. 27, 2021

(54) SOCIAL GRAPH AGGREGATION SYSTEMS AND METHODS

(71) Applicant: KiddoZip, LLC, Boston, MA (US)

(72) Inventors: Bruce Rubinger, Boston, MA (US); Ben Rubinger, Boston, MA (US)

(73) Assignee: KiddoZip, LLC, Boston, MA (US)

( * ) Notice: Subject to any disclaimer, the term of this patent is extended or adjusted under 35 U.S.C. 154(b) by 452 days.

(21) Appl. No.: 13/840,984

(22) Filed: Mar. 15, 2013

Related U.S. Application Data

(60) Provisional application No. 61/753,283, filed on Jan. 16, 2013.

(51) Int. Cl.
*G06Q 30/02* (2012.01)

(52) U.S. Cl.
CPC ............... *G06Q 30/0271* (2013.01)

(58) Field of Classification Search
USPC ............................. 705/14.4–14.73
See application file for complete search history.

(56) References Cited

U.S. PATENT DOCUMENTS

| | | | | |
|---|---|---|---|---|
| 8,630,913 | B1* | 1/2014 | Lawrence | G06Q 30/0633 705/26.1 |
| 2008/0255943 | A1* | 10/2008 | Morten | G06Q 30/02 705/14.53 |
| 2010/0063877 | A1* | 3/2010 | Soroca | G06F 17/30749 705/14.45 |
| 2011/0066497 | A1* | 3/2011 | Gopinath et al. | 705/14.53 |
| 2011/0153423 | A1* | 6/2011 | Elvekrog et al. | 705/14.53 |
| 2012/0022944 | A1* | 1/2012 | Volpi | 705/14.53 |
| 2014/0025702 | A1* | 1/2014 | Curtiss | G06Q 30/02 707/769 |

OTHER PUBLICATIONS

Facebook's homepage downloaded from internet URL https://www.facebook.com/.

\* cited by examiner

*Primary Examiner* — Peter H Choi
*Assistant Examiner* — Derek Jessen
(74) *Attorney, Agent, or Firm* — Hamilton, Brook, Smith & Reynolds, P.C.

(57) ABSTRACT

A system configured to leverage a social graph of a social networking site may be provided. A social graph of a social networking site may be interfaced with to obtain size data from a guardian's account for at least one minor, the minor's size data being one or more letters or numbers representative of a series of measurements for manufactured article. The minor's size data may be provided to one or more users who are authorized by the guardian account to access the minor's size data. The minor's size data may be provided to one or more ecommerce partners. Offers, from the one or more ecommerce partners, may be generated directed to the one or more authorized users, for commercially available manufactured articles that match the minor's size data. When a guardian posts data about the minor on the social network using the inventive system, the posted data is automatically packaged as a scrapbook and sent to authorized users outside of the social network.

13 Claims, 7 Drawing Sheets

SOCIAL GRAPH AGGREGATION SYSTEMS AND METHODS

RELATED APPLICATION

This application claims the benefit of U.S. Provisional Application No. 61/753,283, filed on Jan. 16, 2013. The entire teachings of the above application are incorporated herein by reference.

BACKGROUND

Online users often find it difficult to shop for apparel for another person. This is especially true when the user does not know exactly what he or she is looking for. Consumers, for example, expect to be able to input little information as shopping criteria and, in response, get specific, targeted and relevant information. The ability to consistently identify or recommend a product is a very valuable tool, as it can result in a high volume of sales for a particular product or company. Accommodating these demands, however, in an efficient manner using existing ad, search and recommendation technologies often requires substantial time and resources, which are not easily captured into an ad, search or recommendation system. The difficulties of this process are complicated by the unique challenges that online stores and advertisers face to make products and services known to consumers in this dynamic online environment.

SUMMARY

In today's dynamic online environment, the critical nature of speed and accuracy in information retrieval can mean the difference between success and failure for a new product or service, or even a new company. Consumers want easy and quick access to specific, targeted and relevant recommendations. The current information gathering and retrieval schemes are unable to efficiently provide a user with such targeted information.

Thus, one of the most complicated aspects of developing an information gathering and retrieval model is finding a scheme in which the cost-benefit analysis accommodates all participants, i.e., the users, the online stores, and the developers (e.g., search engine providers). The currently available schemes do not provide a user-friendly, developer-friendly and financially-effective solution to provide easy and quick access to relevant information and recommendations.

Systems, methods, computer program products and apparatuses may be implemented to provide highly targeted online information, which leverage a social graph of a social networking site. Certain example embodiments of the invention may operate within a social networking browsing session, while the social graph of a social networking site may be accessed and used to obtain size data from a guardian's account for at least one minor, the minor's size data being one or more letters or numbers representative of a series of measurements for manufactured articles.

The minor's size data may be provided to one or more users who are authorized by the guardian account to access the minor's size data. The minor's size data may be provided to one or more ecommerce partners. Offers, from the one or more ecommerce partners, may be facilitated to the one or more authorized users, for commercially available manufactured articles that match the minor's size data.

The manufactured articles are any of: clothing, shoes, or hats for the minor. The minor's size data that is provided to users who are authorized by the guardian account to receive the minor's size data may allow the authorized user(s) to view the minor's size data, the name of the minor, the age of the minor, and the birth date of the minor.

When facilitating offers from ecommerce partners, the minor's size data may be passed to an ecommerce partner to use in a shopping session with the authorized user in order to enable filtering of shopping options such that only commercially available manufactured articles that match the minor's size data are displayed to the authorized user at their respective client systems; or responding to a search by the authorized user by automatically causing search results to display only commercially available manufactured articles that match the minor's size data.

When facilitating offers from ecommerce partners, an ad may be displayed to the authorized user. The ad may provide offers for certain commercially available manufactured articles that match the minor's size data.

When interfacing with a social graph of a social networking site, user interest and hobby information may be obtained from the guardian regarding the minor. The minor's user interest and hobby information may be used to facilitate offers, from the one or more ecommerce partners, to the one or more authorized users for commercially available manufactured articles that match at least portions of the minor's user interest and hobby information. The minor's user interest and hobby information may be used to customize the authorized user's online shopping experience. In this way, the minor's user interest and hobby information is extracted and used to customize the shopping experience of another user.

The social graph of a social networking site may be accessed (interfaced with) to obtain accomplishment information regarding the minor from the guardian. Certain updates to the accomplishment information in the social graph may cause ads to be targeted to other users, such as authorized users. The guardian may be provided with access to a list of all authorized users granted authorized access to the minor's size data.

The guardian account may be associated with a guardian (or parent) of the minor. The guardian's account may be a user account on a social networking site utilizing the social graph.

The minor's size information may be automatically extracted from the social graph and passed to one or more users who are outside of the social network who are not represented in the social graph. Information concerning user interests or accomplishments of the minor may be sent to the one or more users outside of the social network who are not represented in the social graph.

A scrapbook detailing name, age, size, interests, hobbies, and accomplishment information of the minor may be created.

An aggregation engine may be provided and configured to interface with a social graph of a social networking site to obtain size data from a guardian's account for at least one minor, the minor's size data being one or more letters or numbers representative of a series of measurements for manufactured articles. A handler, in communication with the aggregation engine, may be provided and configured to provide the minor's size data to one or more users who are authorized by the guardian account to access the minor's size data. The aggregation engine may further be configured to provide the minor's size data to one or more ecommerce partners to facilitate offers, to the one or more authorized users, for commercially available manufactured articles that match the minor's size data.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Digital Processing Environment

Figure 1A:
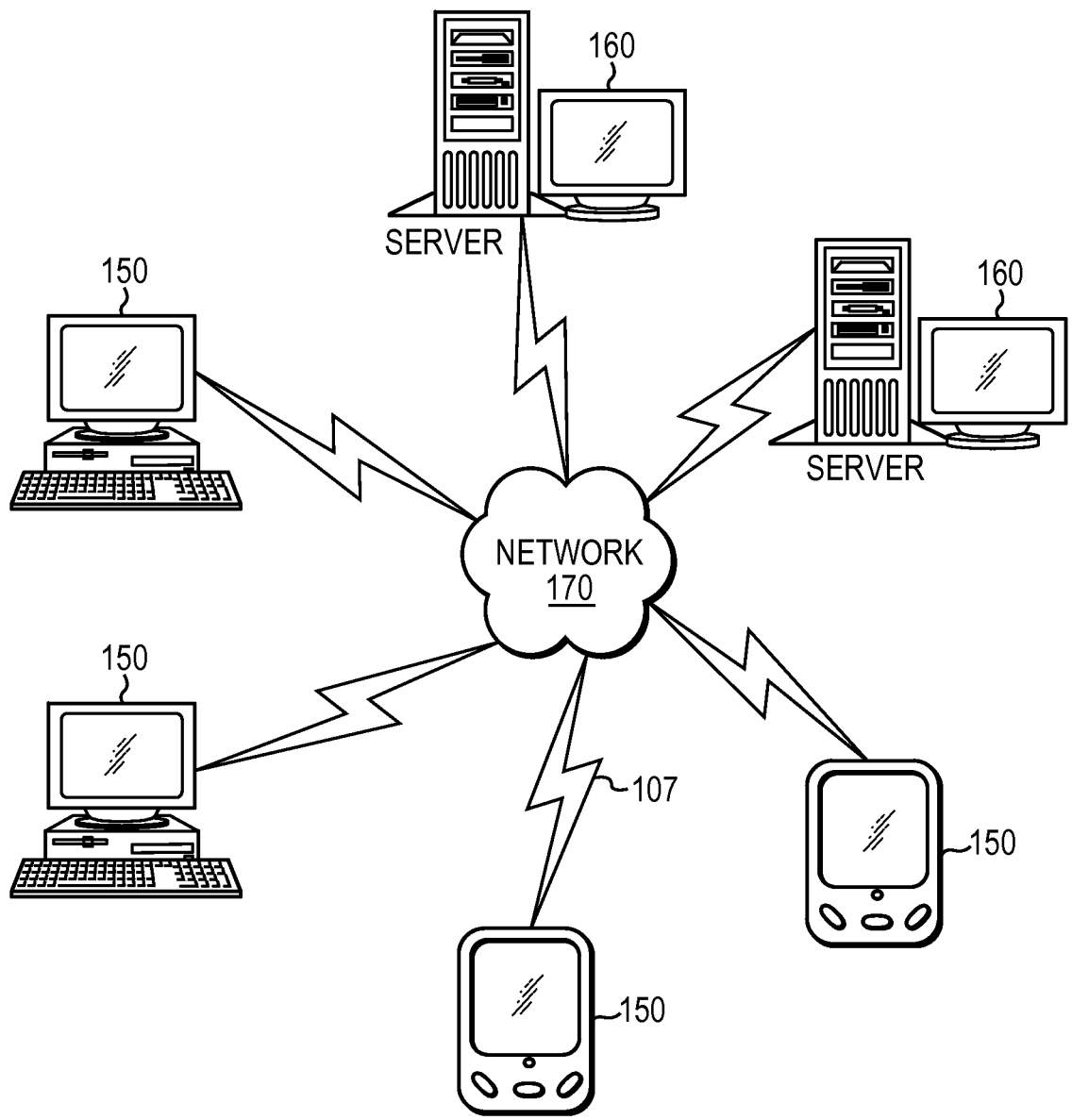
FIG. 1A is a schematic diagram of a computer network environment in which embodiments are deployed.

Example implementations of the present invention may be implemented in a software, firmware, or hardware environment. FIG. 1A illustrates one such environment. Client computer(s)/devices 150 (e.g. mobile phone) and a cloud 160 (or server computer or cluster thereof) provide processing, storage, and input/output devices executing application programs and the like.

Client computer(s)/devices 150 can also be linked through communications network 170 to other computing devices, including other client devices/150 and server computer(s) 160. Communications network 170 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 1B:
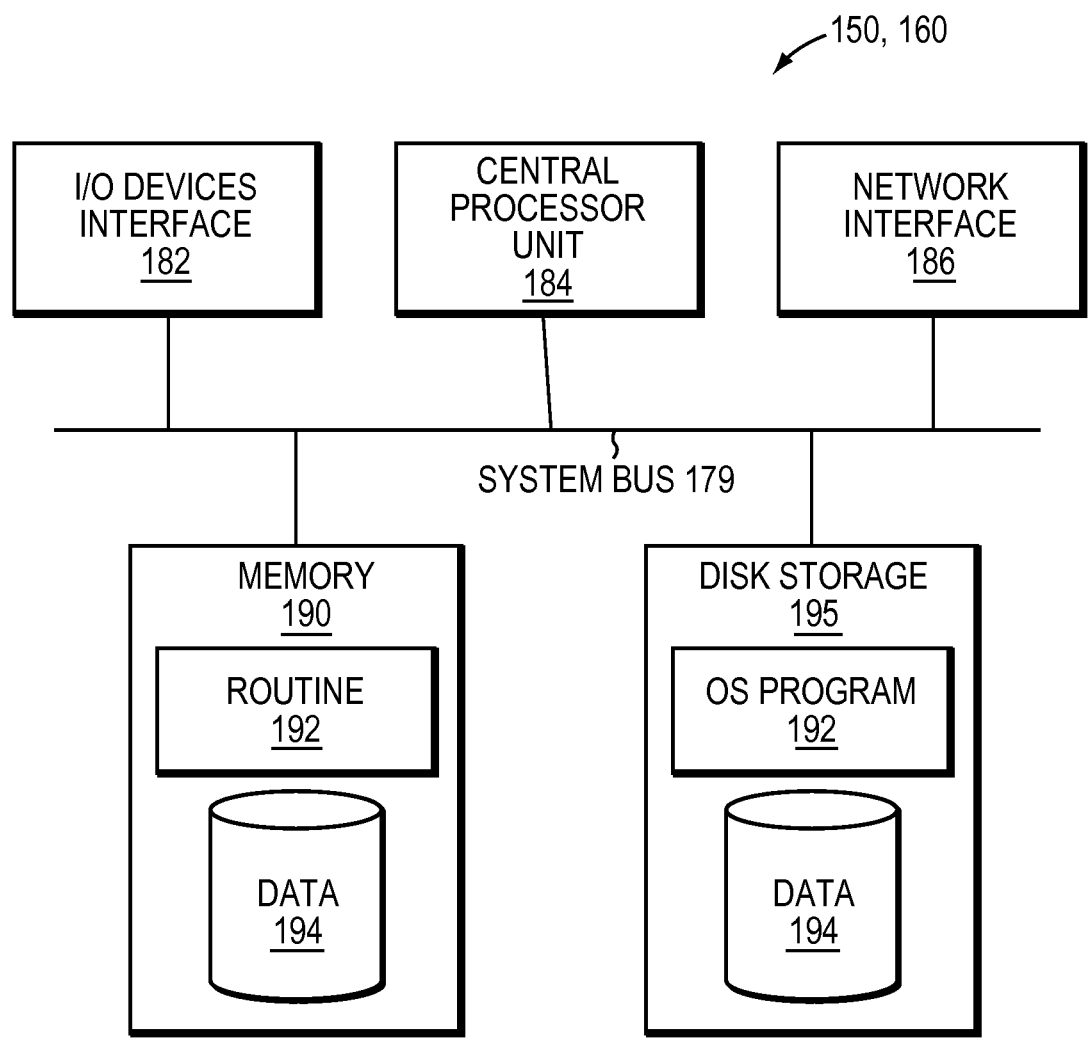
FIG. 1B is a block diagram of the computer nodes in the network of FIG. 1A.

Embodiments of the invention may include means for displaying audio, video or data signal information. FIG. 1B is a diagram of the internal structure of a computer/computing node (e.g., client processor/device/mobile phone device/tablet 150 or server computers 160) in the processing environment of FIG. 1A, which may be used to facilitate displaying such audio, video or data signal information. Each computer 150, 160 contains a system bus 179, where a bus is a set of actual or virtual hardware lines used for data transfer among the components of a computer or processing system. Bus 179 is essentially a shared conduit that connects different elements of a computer system (e.g., processor, disk storage, memory, input/output ports, etc.) that enables the transfer of data between the elements. Attached to system bus 179 is I/O device interface 182 for connecting various input and output devices (e.g., keyboard, mouse, displays, printers, speakers, etc.) to the computer 150, 160. Network interface 186 allows the computer to connect to various other devices attached to a network (for example the network illustrated at 170 of FIG. 1A). Memory 190 provides volatile storage for computer software instructions 192 and data 194 used to implement a software implementation of the present invention (e.g. social graph integration system 100 of FIG. 1C). The social graph integration system 100 maybe implemented in a software embodiment and at least portions of which may operate within a social networking browser session. The social graph integration system 100, for example, may be implemented using any social networking platform interface and programming language, such as, for example, the Facebook Platform and the Facebook Markup Language, which collectively provide a set of programming interfaces, tools, social plug-ins, and functions that enable developers to integrate with the "open graph" of personal relations and operate within the open graph protocol. In a mobile implementation, the user interface framework for the present social graph integration system 100 may be based on XHP, Javelin and WURFL. It should be noted that, the social graph integration system 100 described herein may be configured using any known programming language, including any high-level, object-oriented programming language. In one example, a mobile implementation for OS X and iOS operating systems and their respective APIs, Cocoa and Cocoa Touch maybe implemented using Objective-C or any other high-level programming language that adds Smalltalk-style messaging to the C programming language.

Disk storage 195 provides non-volatile storage for computer software instructions 192 (equivalently "OS program") and data 194 used to implement an embodiment of the social graph integration system 100. Central processor unit 184 is also attached to system bus 179 and provides for the execution of computer instructions. Note that throughout the present text, "computer software instructions" and "OS program" are equivalent.

In one embodiment, the processor routines 192 and data 194 are a computer program product, display engine (generally referenced 192), including a computer readable medium capable of being stored on a storage device 195, which provides at least a portion of the software instructions for the social graph integration system 100. The social graph integration computer program product 192 can be installed by any suitable software installation procedure, as is well known in the art. In another embodiment, at least a portion of the social graph integration system software instructions may also be downloaded over a cable, communication and/or wireless connection. In other embodiments, the social graph integration system is a computer program propagated signal product 107 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present social graph integration system invention routines/program 192.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is transmitted over the propagation medium over a period of time, such as the instructions for a software application sent in packets over a network over a period of milliseconds, seconds, minutes, or longer. In another embodiment, the computer readable medium of computer program product 192 is a propagation medium that the computer system 150 may receive and read, such as by receiving the propagation medium and identifying a propagated signal embodied in the propagation medium, as described above for computer program propagated signal product.

System Architecture

A social network system may maintain social graph information, which can generally model the relationships among groups of individuals, and may include relationships ranging from casual acquaintances to close familial bonds. A social network may be represented using a graph structure. Each node of the graph corresponds to a member of the social network having a user profile. Edges connecting two nodes represent a relationship between two users.

Figure 1C:
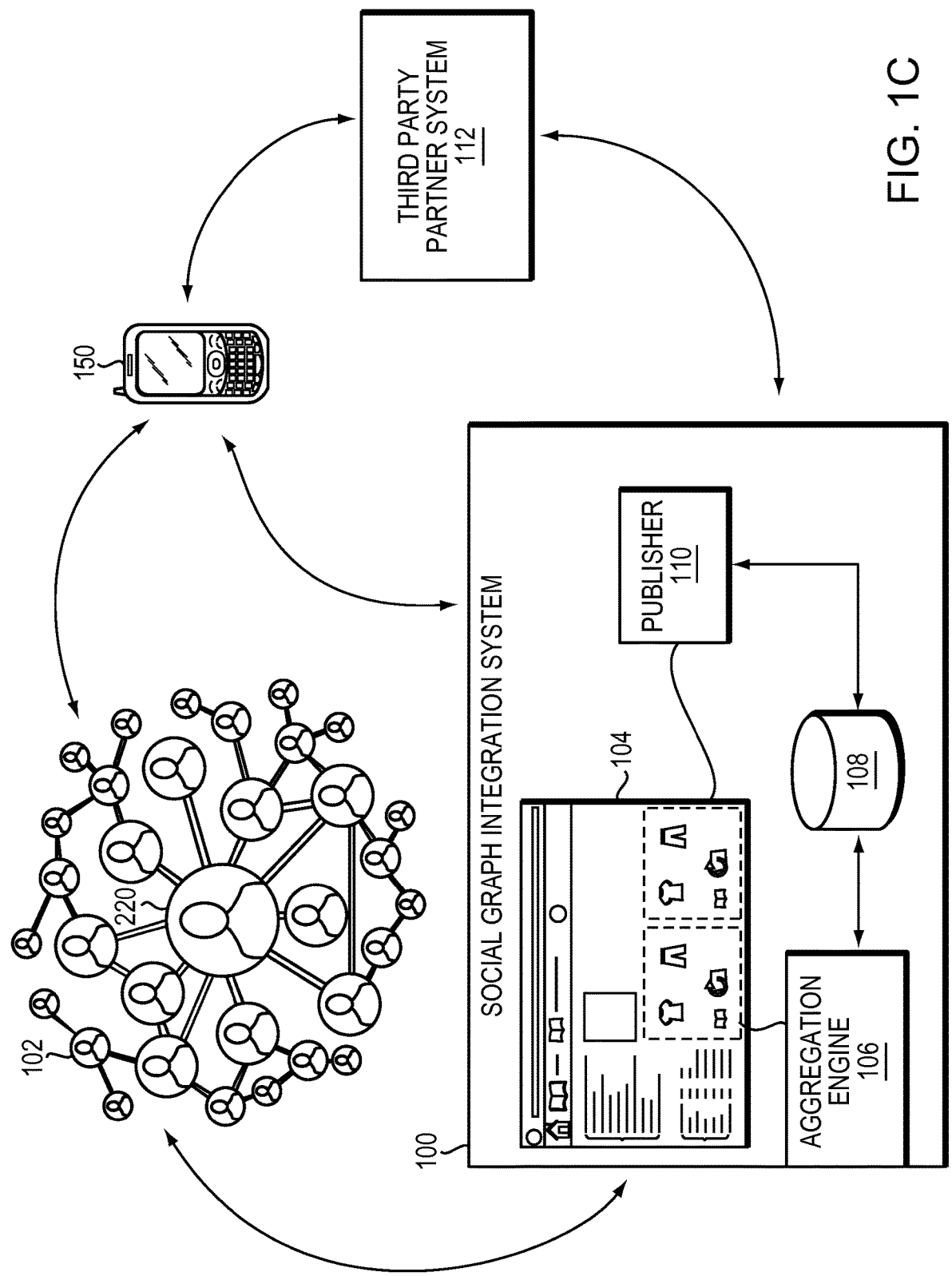
FIG. 1C is a system level diagram of an embodiment of the social graph integration system.

FIG. 1C is a system level diagram of an embodiment of the social graph integration system 100. A social graph 102 is an API that allows the system 100 to access profiles and manage social objects and action links associated with a particular user account. A user profile from the social network may be associated with the guardian account 220. The guardian account may login through the system 100 to the social network. Similarly, the guardian account 220 may login to the social network to connect to the system 100. The guardian account 220 may post using the system 100, and those posts may appear on a web interface 104 associated with the system 100.

The system 100, for example, may be embedded into website code, which generates the interface 104; or it may be implemented as an app executing in the social networking environment. The website code for system 100 may be, for example, a web based application (aggregation engine) 106 configured with computer readable instructions for parsing, e.g. PHP, which parse the social objects of the guardian account 220. The aggregation engine 106 pulls the graph objects from social graph 102. The aggregation engine can be implemented using PHP scripting (server side) and Javascript (client side).

For example, a user visits a webpage 104 hosted by the system 100, which contains Javascript code. That Javascript code starts a conversation with social network servers via the social graph API 102 on behalf of the current user. If the user is not logged into the social network or has not installed the aggregation engine 106 (browser plug-in), the user is provided with an option to login to the social network. The user is also are presented with a confirmation requesting permission to install the aggregation engei with an engine/browser plug-in.

Once the user logs-in and the system 100 confirms he/she is a guardian, a session ID is assigned, all of the guardian's associated graph objects (minor children data associated with the guardian account) is downloaded and then drawn in the guardian's web browser at a respective client system 150. The guardian has read/write access to the graph objects that she or he created for her or his child.

If, for example, the user is connected via the social graph (i.e. is Facebook friends) with an second user of the system 100 and, that first user has specified privacy settings that include (permit) the second user in question access, that other user will see the relevant info about the Facebook friend's children, being granted read-only access, even though the second user may not be a member of the social network (Facebook).

Access to the guardian's graph objects are permitted until the session is terminated or expires.

If the user is not the guardian, but rather an authorized member who has been granted access previously by the guardian via the system 100 to the guardian's minor children data, once the user logs-in and the system 100 confirms he/she is an authorized member, a session ID is associated, and all of the guardian's associated graph objects (minor children data associated with the guardian account) is downloaded and then drawn in the authorized user's web browser at a respective client system 150.

The authorized member has read access to the guardian's graph objects. Access to the guardian's graph objects are permitted until the session is terminated or expires. Information from the guardian's graph objects regarding the children's size data may be passed to create a shopping context for the authorized member.

It should be noted that when the webpage is drawn on the browser interface at the client system 150, the system 100 is controlling and operating the webpage, which is hosted outside of the social network. Likewise, the system 100 is an external service operating outside of the social network. In another embodiment, aspects of the system 100 may be executing within the social network, when the guardian/authorized member logs into the social network.

Social network action links may be generated to enable the system to manage certain posting output to their timeline while the guardian account is logged into the social network.

Figure 1D:
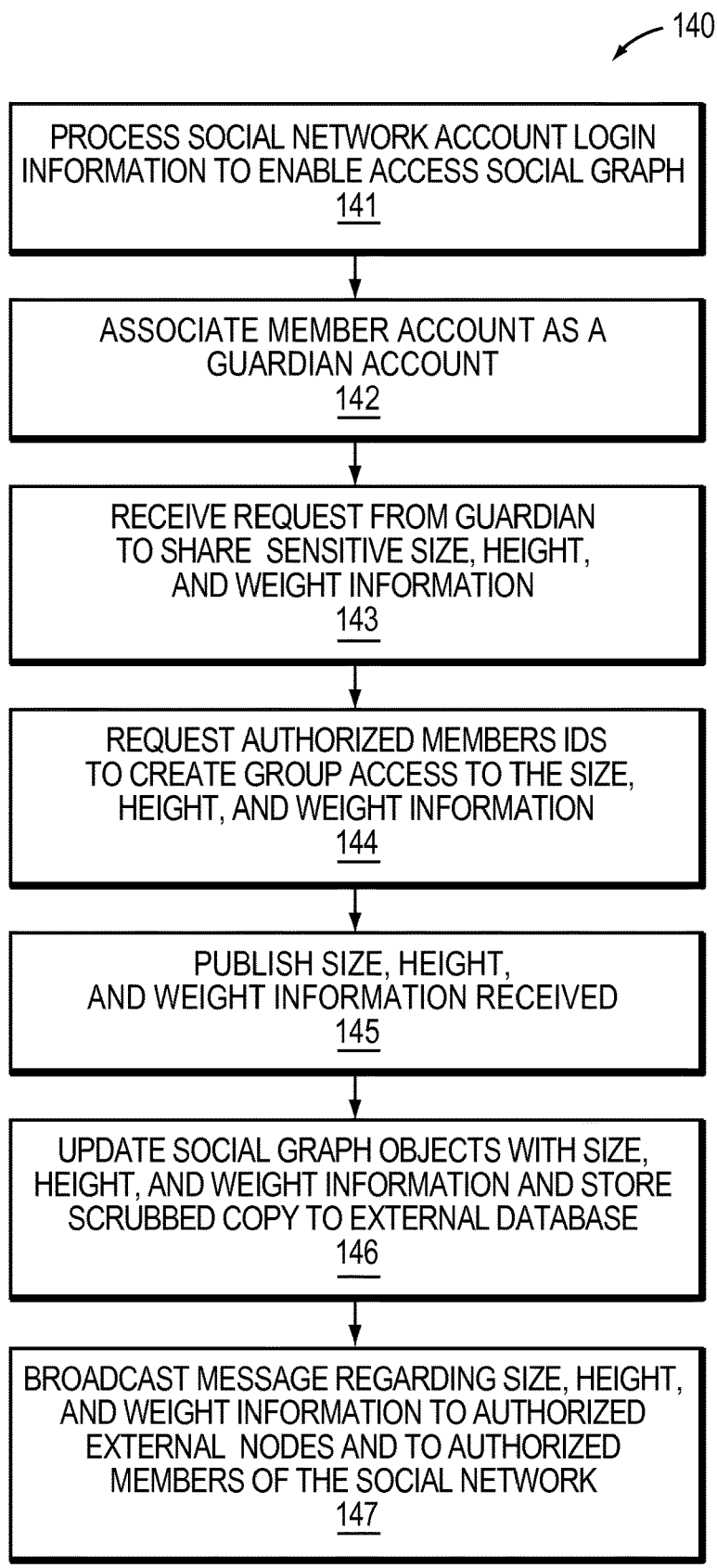
FIG. 1D is a flow diagram of an example process in which a guardian account accesses the system 100.

FIG. 1D is a flow diagram of an example process 140 in which a guardian account accesses the system 100. A user, for example, may attempt to connect to the system 100 via a web interface. At 141, the user logs into to the system 100 using their respective social network login. The system 100 processes the login information in connection with the social graph API 102. In this example, the system 100 successfully authenticates the user at 142 and determines that the user is associated with a guardian account 220. At 143, the system 100 receives a request from the user to input information regarding the height, weight and size of the user's children. At 144, the system 100 requests that the user specify members or groups that should be granted access to the information. At 145, the system 100 publishes this information. It can be stored directly in the social graph object, or it can be stored in the system 100 database 108, or both. Information can be scrubbed if stored in the database at 146. If stored outside of the network in the database 108, then the social graph object will be updated with a pointer to this information in the database or in an alternative implementation assigned an ID, and the object will be updated with the unique id of the graph object to which the database 108 row corresponds in the inventive system. At 147, the information can be broadcast to the authorized users.

Referring back to FIG. 1C, the system 100 may request size data (and related information) associated with minor children from the guardian account 220. In one embodiment, the aggregation engine 106 stores the child's size related data received as input from the guardian account all in graph objects via the social graph 102. In another embodiment, in addition to store the data to the graph objects via the social graph 102, a scrubbed version of the data may be stored to the social graph integration system database 108. In another embodiment, the child's size related data can be stored only in the database 108, and it would be linked to the social graph 102 by, for example, specifying the unique id of the graph object to which the database 108 row corresponds in the inventive system 100. By storing child's size related data only in the database 108, the system 100 can protect privacy concerns by its members. For example, the child's size related data would be stored outside the social network, and this would prevent the social network from data mining this potentially sensitive information.

In one exemplary preferred embodiment, the scrubbed version of the size data will strip out anything that identifies the child including her name, birthday (which is replaced with an age range) and notes/interest text. In this way, primarily the scrubbed data (child's age and size information) is preserved in a way that protects the child's anonymity and ensures she is unidentifiable. Preferably, the scrubbed data is not linked to the original posted entries associated with the guardian account. An anonymous hash may be generated and associated with the size data entry. After a several guardian accounts have used the system 100 to share their respective size data for their respective children, the system 100 generates a thread aggregating the scrubbed posts, which can be shared with third party systems 112 for analysis, without violating the guardians' privacy concerns. For instance, the system 100 can proclaim to potential partners 112 that there are 10,000 kids between the ages of 2-4 who are represented on system 100. In another example, the system 100 can alert third party systems 112 with insights, such as "There are 8 posts about child anonymous123 during calendar year 2012, and here is the size info for them all."

Personalized Shopping for Other Users Based on Stored Size Attributes

Figure 2:
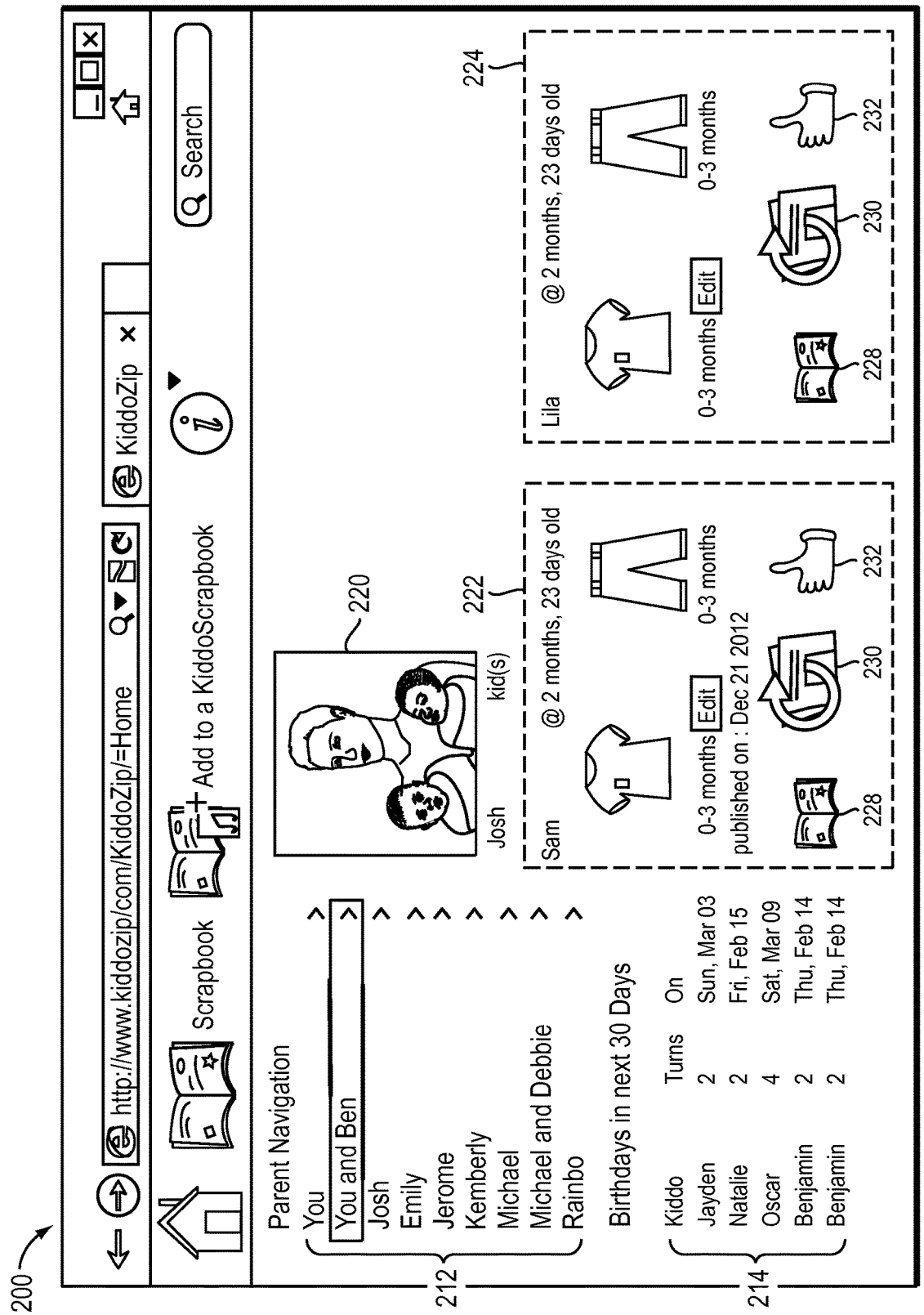
FIG. 2 is an example screenshot of an interface showing aggregated view of size information of a minor shared by a guardian account in accordance with an embodiment of the invention.

Aspects of the social graph integration system 100 allow parents/guardians to privately publish their children's current size info (for tops, bottoms, shoes and hats). These size attributes can be passed on to other independent users and third party systems to implement highly targeted ads, information sharing and customized shopping experiences. The other independent users (end users) may be specifically authorized by the guardian/parental account to have access to the size attributes. FIG. 2 is an example screenshot of an interface 200 showing aggregated view of size information of a minor shared by a guardian account 220 in accordance with an embodiment of the invention. Further, the guardian account 220 may use the social graph integration system 100 to configure the interface 200 to include alerts 214, such as birthday notifications.

When authorized end users 212 load the interface 200, they are provided with an aggregated view of the size data for all children (e.g. first and second minors 222, 224) specified by the guardian account 220. The authorized users 212 may be designated by the guardian account 220 or be Facebook friends with the guardian account 220.

In this way, the parent/guardian account 220 is given the ability easily and quickly share size information about any child to whom which they are connected. In one embodiment, this size attribute information 222, 224 may be shared with ecommerce partners 112 who may recommend to end users children's apparel websites that carry apparel in the relevant sizes. Hyperlinks to such sites may be configured by the system 100 to pass, if clicked, in the size information 222, 224 to a third party partner system 112 and configure a matching "shopping context" so that when an authorized end user 212 commences his/her shopping session, they will be presented with a filtered set of offerings that fit the child. This will create a more user friendly and highly targeted shopping experience, ensuring that the child receives items from others that fit. The guardian account 220 may via the aggregation engine 106 update 230 the respective aggregated views for each identified minor 222, 224; and once the guardian account 220 is satisfied with the revised content, the update can be published 232 by the publisher 110.

Figure 3:
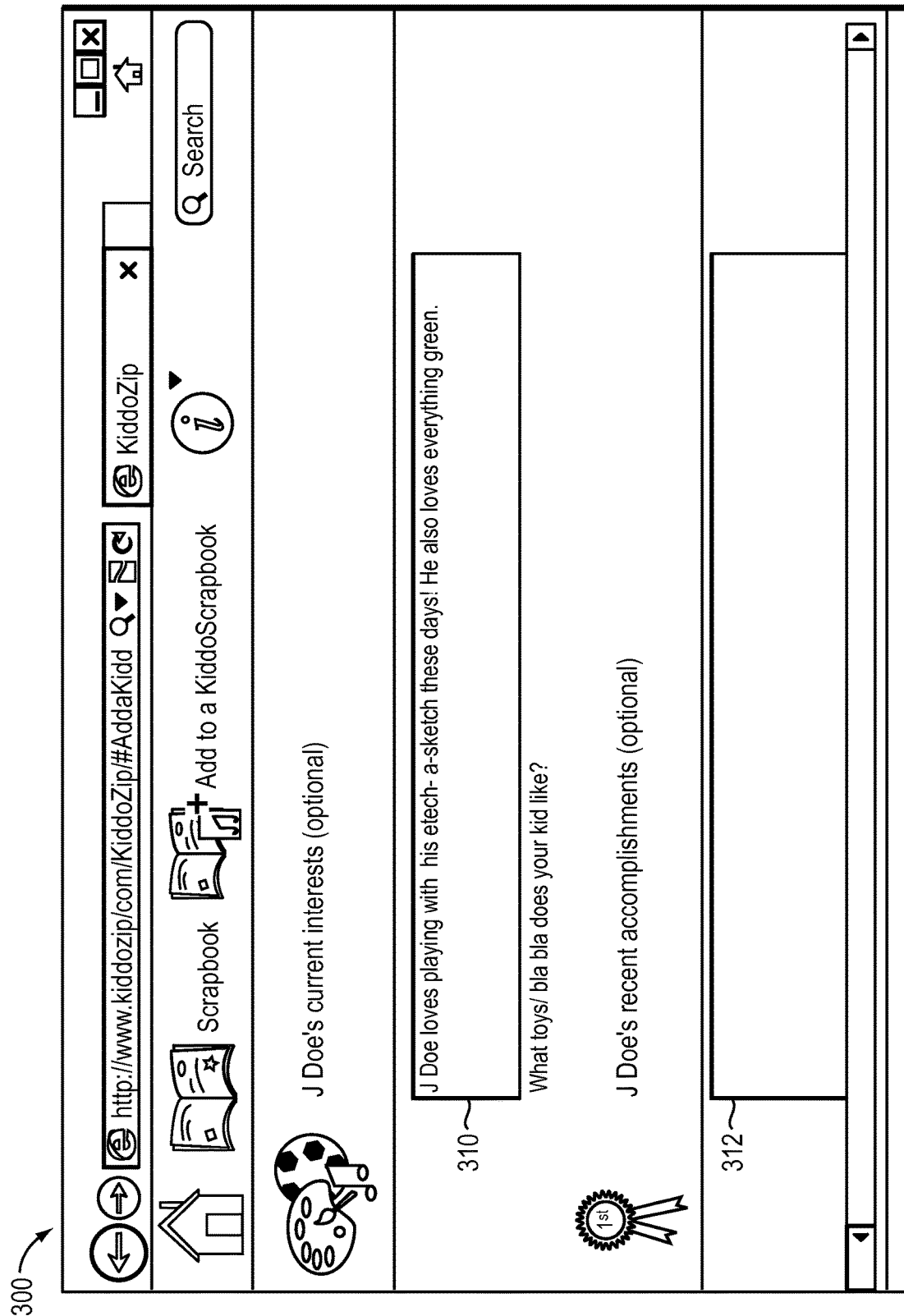
FIG. 3 is an example screenshot of an interface showing current interests and accomplishment information relate to a minor, which has been shared by a guardian account in accordance with an embodiment of the invention.

Embodiments of the social graph integration system 100 allow a guardian account to enter information about their child's current interests. FIG. 3 is an example screenshot of an interface showing current interests 310 and accomplishment 312 information relate to a minor, which has been shared by a guardian account 220 in accordance with an embodiment of the invention.

In one example embodiment, a different type of shopping personalization takes place based on the "current interests" text 310. A text parsing algorithm, such as PHP, parses the user interest information to then try to offer a customized shopping experience to other users, suggesting items that are likely to be of interest based on the user interest information for the minor that has been input by the guardian/parent account 220. As shown in the interest information 310 in FIG. 3, green may be a keyword that sticks out, suggesting the child's color current interest.

As guardians/parents typically enjoy sharing information about their children with their close friends, this sensitive information can be leveraged by the present social graph integration system 100 to customize ads, profile information, and the shopping experience for other users who are not the guardians/parents. The data may be shared with users authorized by the guardians/parents. The data is stored in the Facebook socialgraph, which provides privacy controls to ensure the safety of this data.

While others often have difficulty shopping for the children of others due to their rapidly growing bodies, adults can have difficulty finding clothing that fits them well. When an adult user shops online for clothes, they are presented with a plethora of choices, the majority of which are unlikely to fit them. Shopping for others presents similar challenges, such that one does not always know the correct size for the recipient of the clothes. Using the inventive concept of providing size information across the social graph, friends can shop for another user in that way. Implementing these inventive concepts, may be very beneficial, increasing confidence in the fit of clothes and therefore driving increased sales and fewer returns.

Information Delivery Beyond the Social Graph

When parents use the social graph integration system 100 to share information about their children (in a "scrapbook page"), the primary axis for that information is via a social networking social graph. For example, "open graph" objects store the relevant information, and the information may be displayed to the Facebook friends of the parent who posts the information in their Facebook newsfeeds, as well as on the timeline of the parent if others choose to browse to it. Further, the social graph integration system 100 may be configured to parse these social objects whenever someone visits (accesses) the social graph integration system 100 to present the user with the information in the format of virtual scrapbooks (rather than the textual objects that appear via the Facebook interface.)

This works very well for sharing news about one's children with one's Facebook friends, but does not work when some people connected to the parent do not use Facebook. In the past, the parent would use separate channels to share the information. For example, one may post a photo to Facebook and separately email copies of that photo to others that are not within Facebook. This creates an unnecessary burden to online users that frustrates their ability to easily share content with others that beyond the social network. To address this, an embodiment of the social graph integration system 100 includes a feature which allows the parent to post both to Facebook and to specify email addresses simultaneously.

Figure 4:
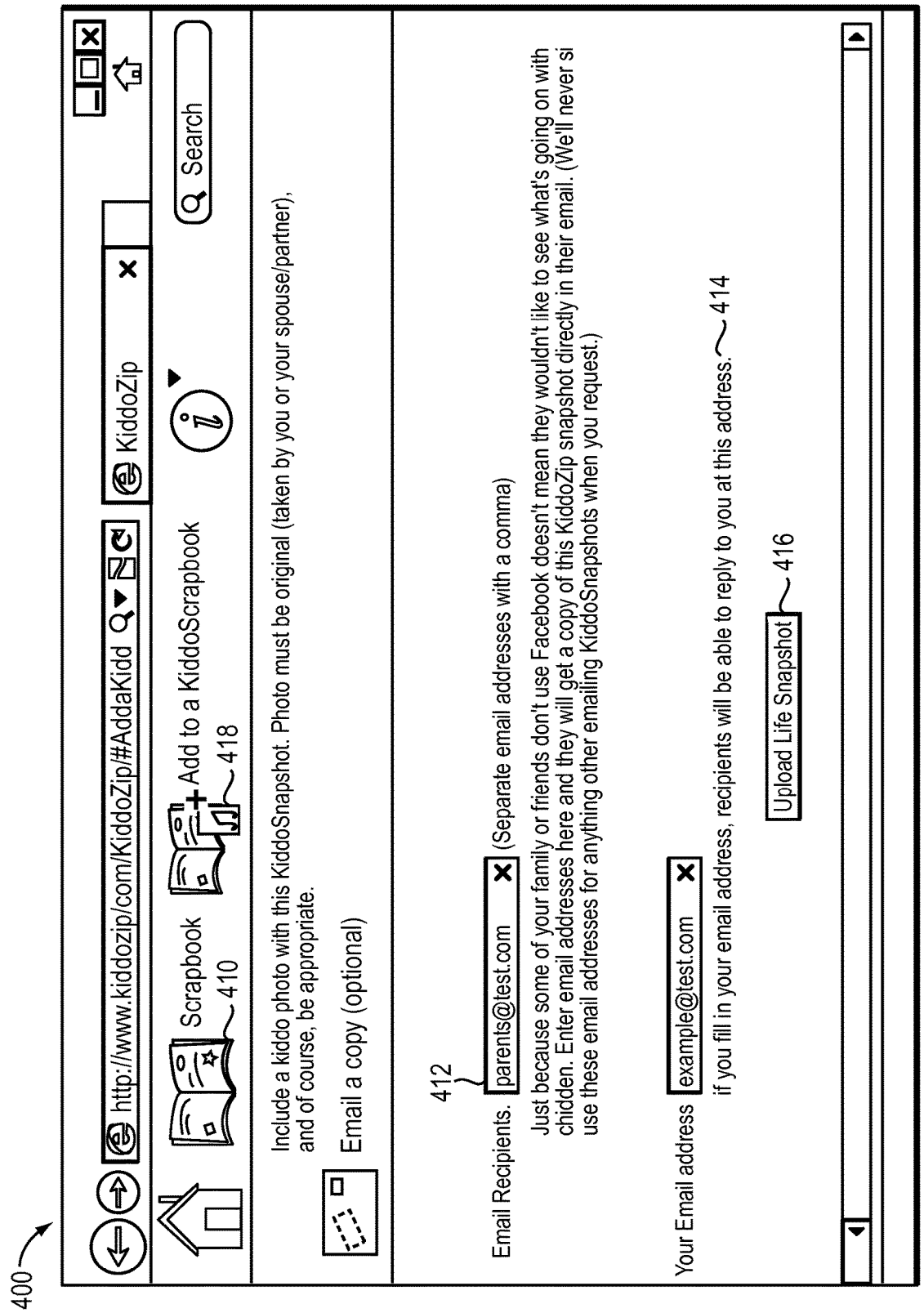
FIG. 4 is an example screenshot of an interface showing how the minor's size information can be shared outside the social graph.

For instance, FIG. 4 is an example screenshot of an interface 400 showing how size information can be shared outside the social graph. A guardian account 220 can generate content including information about minor children's sizes, as well as photos or other scrapbook 410 information on the social network and share it with others outside of the social network via a external message. Additional content may be uploaded 416, which may be automatically packaged with the external message that is routed and sent outside of the Facebook social network. In one embodiment, the content may be sent by email to authorized email recipients 412. The guardian may designate their own respective email address 414 from which the content will appear to come. In this way, recipients can easily reply to the content/post. In the past, users typically had to have access to Facebook in order to see a user's post. With the present social graph integration system 100, posts may be easily shared outside of Facebook.

Any email recipient specified will get a copy of the same information which is in the process of being shared with the Facebook friends of the parent, including a photo, notes, and clothes sizes of the child. In one embodiment, the inventive system only sends out the current scrapbook page being created. In another embodiment, additional information, such as all scrapbook pages ever created (the entire scrapbook) are automatically sent outside of the social network.

Scrapbook Implementation

In one embodiment, the social graph integration system 100 may be implemented as social networking (e.g. Facebook) application that allows parents (guardians) to build virtual scrapbooks for their children. Included in these scrapbooks can be information regarding the child's weight and height, photos, notes and clothes sizes of the child at various points in their life. Note that the weight and height information is typically reserved for very young children, usually about 4 years of age or under. The social graph data may be aggregated and generated as a hardcopy. Using an open graph, the inventive social networking application can post data to Facebook. Open graph objects store the attributes (such as notes and clothing sizes) about children, and a photo. This information appears alongside other social updates in the context of Facebook (via the newsfeed and timeline). But, it can also be accessed by the social graph integration system 100 programmatically. The social graph integration system 100 makes use of this functionality to present this information in several ways:

a) Slideshows featuring fullscreen photos of children;
b) A summary page showing the latest information on all kids connected to the facebook user via their parents; and
c) Aggregated 'family books' that merge together scrapbook entries for multiple children of the same family into a single chronological view.

Beyond visualizing the data in multiple ways as described above, the social graph integration system 100 has extends this inventive concept further, and extracts the information stored in this social context, creates a package and sends it to the printer to be printed. Just as this social information can be programmatically accessed to be displayed in different ways, it can be programmatically accessed and "forwarded" to a printing service which uses an API that allows software developers to programmatically specify content that they would like printed. The social graph integration system 100 acts as a bridge between the data (stored on Facebook in a raw, unformatted way) and the printing company. This allows users to purchase printed copies of data which they have shared on Facebook. In this way, a user-initiated printing request may be implemented.

Further, the inventive social networking application combines storing data inside social open graph objects, and later programmatically accessing and transforming that information into a printable format. It's important to note that this is more elaborate than the simple process that a computer system would take to, for example, print a copy of one's Facebook newsfeed containing this information. Rather, in the social graph integration system 100 example, the information is transformed such that it is repackaged and sent to a commercial printer where a professionally pressed (and optionally bound) copy is printed and mailed to the recipient for a fee.

While this invention has been particularly shown and described with references to example embodiments thereof, it will be understood by those skilled in the art that various changes in form and details may be made therein without departing from the scope of the invention encompassed by the appended claims.

For example, while aspects of the invention have been discussed in the context of the Facebook social graph, it should be noted that any social network may be used, such as Google+ or Twitter. Further, while the invention has been described as being implemented as a social networking application, one of ordinary skill would appreciate that the inventive concepts may be in any software or hardware implementation.

What is claimed is:

1. A computer program product embodied on a non-transitory computer readable medium having computer readable instructions executable by one or more computer processors configured to leverage a social graph of a social network system including:

processing a privacy request, from a guardian computing device, to prevent a social network system from mining private electronic data from the guardian computing device on the social network system via a network session opened by an internet browser-plugin executing at a guardian computing node by:

opening the network session at a session layer at the social network system using the internet browser-plugin executing at the guardian computing node;

creating a unique id of a graph object to which a row in a private social graph integration system database corresponds, the graph object storing the private electronic data including private electronic data about a minor;

creating an anonymous hash of the graph object, such that hash of the graph object results in scrubbed private electronic data;

updating a social graph of the social network system to include a pointer to the unique id of the graph object corresponding to the private electronic data; and interfacing with the social graph at the social network system to authorize a plurality of user accounts in the social network systems to receive an update relating to the scrubbed private electronic data; and interfacing with the social graph at the social network system to broadcast the update relating to the scrubbed private electronic data to the plurality of authorized user accounts in the social network system;

in response to receiving a request, from a third party computing device associated with one of the plurality of authorized user accounts, for access to the scrubbed private electronic data at the social graph of a social networking site, preparing at least one network packet via an internet network interface with network permissions associated with the third party computing device request;

administering electronic privacy constraints restricting the request to access the private electronic data via a computer network;

extracting the scrubbed private electronic data;

providing, from the private social graph integration system database, the private electronic data to the third party computing device;

transforming the private electronic data according to a privacy protocol based on the privacy constraints to scrub the private electronic data of personally identifying information;

providing the transformed scrubbed version of the private electronic data from the private social graph integration system database to one or more ecommerce partner servers;

receiving, from the one or more ecommerce partner servers, a filtered set of data identified through use of the transformed scrubbed version of the private electronic data;

generating a custom graphical user interface for the third party computing system based on the private electronic data and the filtered set of data; and providing the generated custom graphical user interface to the third party computing device.

2. The computer program product as in claim 1 wherein the filtered set of data identifies manufactured articles that are any of: clothing, shoes, or hats for the minor.

3. The computer program product as in claim 1 further including computer readable instructions providing the scrubbed private electronic data about the minor including:

enabling the third party computing system to view the minor's size data;

enabling the third party computing system to view the name of the minor;

enabling the third party computing system to view the age of the minor; and enabling the third party computing system to view the birth date of the minor.

4. The computer program product as in claim 3 wherein the computer readable instructions providing the generated custom graphical user interface facilitate a shopping session with the authorized user in order to enable one or more of:

filtering of shopping options such that only commercially available manufactured articles that match size data in the scrubbed private electronic data are displayed to the third party computing system; and responding to a search by the third party computing system by automatically causing search results to display only commercially available manufactured articles that match the minor's size data.

5. The computer program product as in claim 3 wherein the computer readable instructions providing the generated custom graphical user interface includes computer readable instructions directing an ad to be displayed to the third party computing system, the ad providing offers for certain commercially available manufactured articles that match the minor's size data.

6. The computer program product as in claim 3 wherein the private electronic data about the minor includes user interest and hobby information.

7. The computer program product as in claim 6 wherein the minor's user interest and hobby information is used to generate the custom graphical user interface, the custom graphical user interface generated using the interest and hobby information including commercially available manufactured articles that match at least portions of the minor's user interest and hobby information.

8. The computer program product as in claim 7 wherein providing the generated custom graphical user interface includes facilitating an online shopping experience for the authorized user wherein the minor's user interest and hobby information is used to create a shopping context filter that customizes the authorized user's online shopping experience.

9. The computer program product as in claim 1 wherein the guardian computing node is associated with a guardian's account that corresponds to a user account on the social networking system utilizing the social graph.

10. The computer program product as in claim 3 wherein the computer readable instructions further includes computer readable instructions to automatically pass the minor's size data to one or more users who are outside of the social network who are not represented in the social graph.

11. The computer program product as in claim 10 wherein the computer readable instructions further includes computer readable instructions for sending information concerning user interests or accomplishments of the minor to the one or more users outside of the social network who are not represented in the social graph.

12. The computer program product as in claim 10 wherein the computer readable instructions further includes computer readable instructions for scrubbing information about the minor from the social graph and sharing the information with third party systems.

13. A data processing system configured to leverage a social graph of a social network system, the system comprising:

an internet browser-plugin executing at a guardian computing node processing a privacy request, from a guardian computing device, the internet browser-plugin preventing a social network system from mining private electronic data from the guardian computing device on the social network system by:

opening a network session at a session layer of the social network system;

creating a unique id of a graph object to which a row in a private social graph integration system database corresponds, the graph object storing the private electronic data including private electronic data about a minor;

creating an anonymous hash of the graph object, such that hash of the graph object results in scrubbed private electronic data;

updating a social graph of the social network system to include a pointer to the unique id of the graph object corresponding to the private electronic data;

interfacing with the social graph at the social network system to authorize a plurality of user accounts in the social network systems to receive an update relating to the scrubbed private electronic data; and interfacing with the social graph at the social network system to broadcast the update relating to the scrubbed private electronic data to the plurality of authorized user accounts in the social network system; and a third party computing device associated with one of the plurality of authorized user accounts, requesting access to the scrubbed private electronic data at the social graph of a social networking site, the third party computing node preparing at least one network packet via an internet network interface with network permissions associated with the third party computing device request;

a server in communication with the private social graph integration system database, the server administering electronic privacy constraints restricting the third party computing device's request to access the private electronic data, the server configured to:
extract the scrubbed private electronic data;
provide, from the private social graph integration system database, the private electronic data to the third party computing device;
transform the private electronic data according to a privacy protocol based on the privacy constraints to scrub the private electronic data of personally identifying information;
provide the transformed scrubbed version of the private electronic data from the private social graph integration system database to one or more ecommerce partner servers;
receive, from the one or more ecommerce partner servers, a filtered set of data identified through use of the transformed scrubbed version of the private electronic data;
generate a custom graphical user interface for the third party computing system based on the private electronic data and the filtered set of data; and
provide the generated custom graphical user interface to the third party computing device.

\* \* \* \* \*

UNITED STATES PATENT AND TRADEMARK OFFICE
CERTIFICATE OF CORRECTION

| | | |
|---|---|---|
| PATENT NO. | : 10,991,010 B1 | Page 1 of 1 |
| APPLICATION NO. | : 13/840984 | |
| DATED | : April 27, 2021 | |
| INVENTOR(S) | : Bruce Rubinger and Benjamin I. Rubinger | |

It is certified that error appears in the above-identified patent and that said Letters Patent is hereby corrected as shown below:

On the Title Page

In Item (72) Inventors, delete "Ben Rubinger" and add --Benjamin I. Rubinger--

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*